(No Model.)  2 Sheets—Sheet 1.

C. MOUSLEY.
CABLE CAR.

No. 341,764.  Patented May 11, 1886.

Witnesses:
T. C. Brecht
Louis Seger, Jr.

Inventor
Charles Mousley
By M. J. Gilmore
Attorney (No Model.) 2 Sheets—Sheet 2.

C. MOUSLEY.
CABLE CAR.

No. 341,764. Patented May 11, 1886.

Witnesses:
T. C. Brecht,
Louis Beyer, Jr.

Inventor:
Charles Mousley,
By M. J. Glavon
Attorney.

UNITED STATES PATENT OFFICE.

CHARLES MOUSLEY, OF PHILADELPHIA, PENNSYLVANIA.

CABLE CAR.

SPECIFICATION forming part of Letters Patent No. 341,764, dated May 11, 1886.

Application filed December 15, 1885. Serial No. 185,746. (No model.)

*To all whom it may concern:*

Be it known that I, CHARLES MOUSLEY, a citizen of the United States of America, residing at Philadelphia, in the State of Pennsylvania, have invented certain new and useful Improvements in Cable Cars, of which the following is a specification, reference being had therein to the accompanying drawings.

My invention relates to improvements in cars in which the motor is a cable of ordinary construction; and the object of my invention is to enhance, by mechanical contrivance, the power or applicability, also economy in use, of said motor.
To this end my invention consists, first, in the device for applying to the car a cable guided securely upon extra friction-wheels made to run loose on the axle of the car and to work inside of the affixed wheels, thus acting, in conjunction with the brakes, as friction-clutches, and thereby facilitating the starting and stopping of the car; second, to govern said friction-wheels and to throw them in and out of gear by one and the same motion by which the brake-wheel is operated on the top of the car, and, third, in a conduit built at the side of the track—one of easy yet durable construction.

Figure 1:
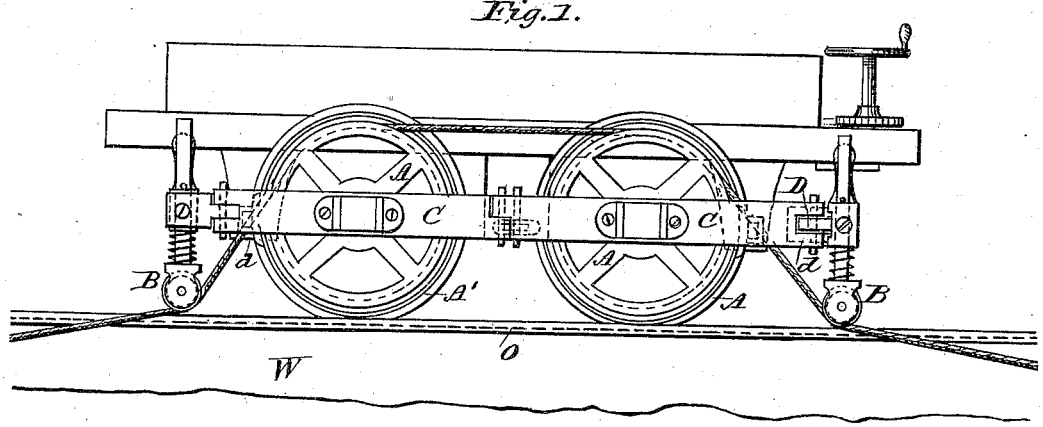
Figure 2:
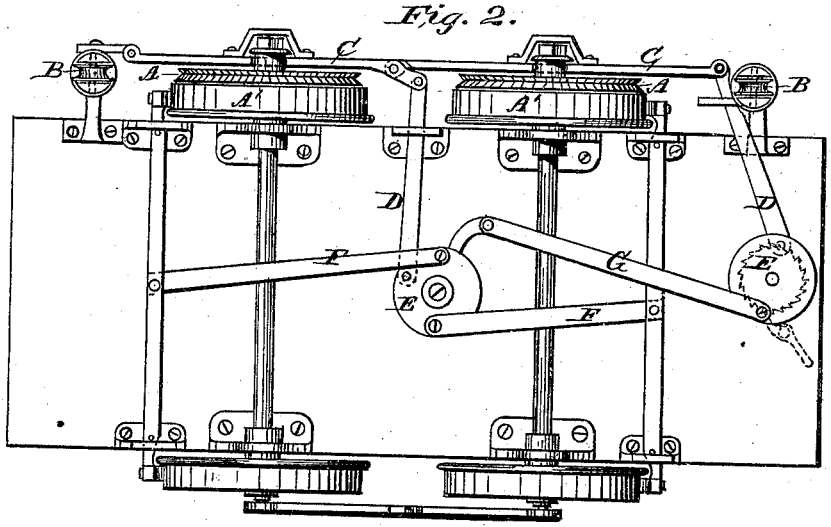
Figure 3:
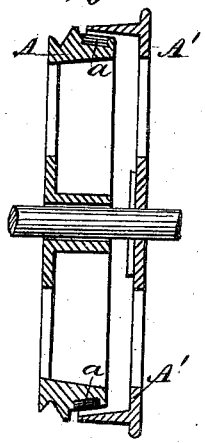
Figure 4:
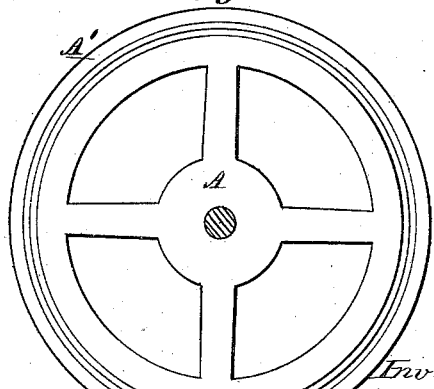
Figure 5:
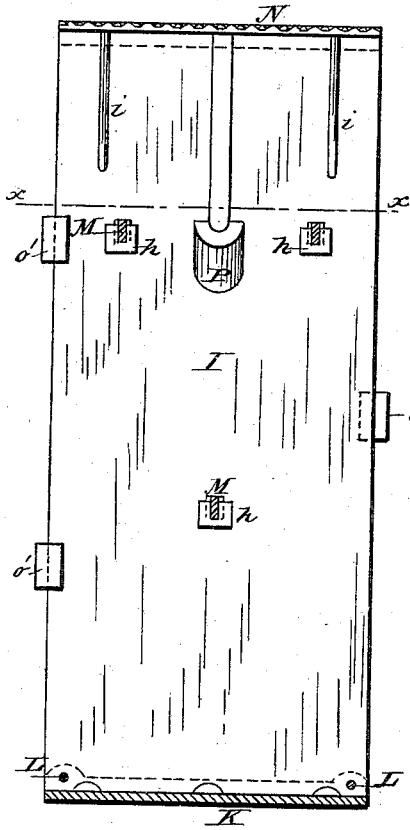
Figure 6:
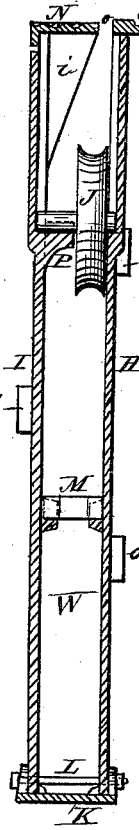
Figure 7:
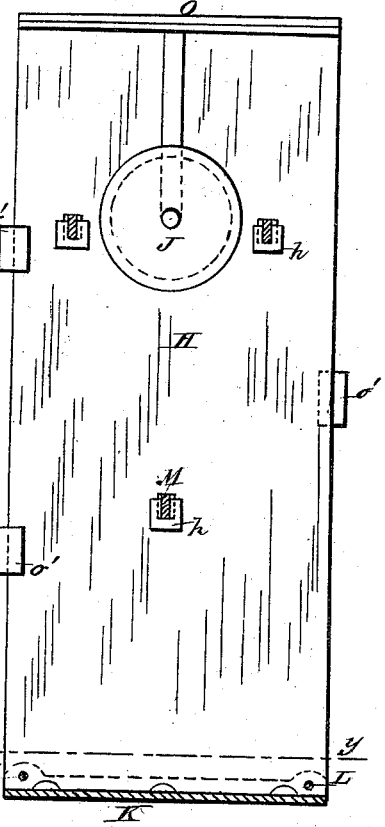
Figure 8:
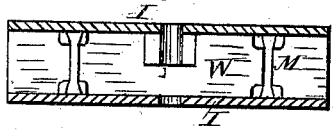
Figure 9:
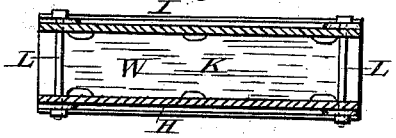
Figure 10:
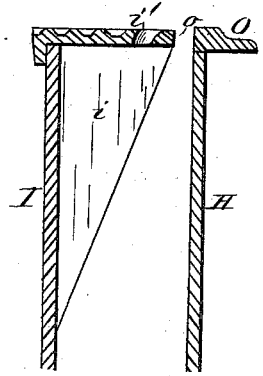

I attain my objects by the mechanism illustrated in the accompanying drawings, in which Figure 1 is a side elevation of my improved cable car, and Fig. 2 a bottom view of the same. Fig. 3 is a cross section of the extra friction-wheels, and Fig. 4 a side view of the same. Fig. 5 represents one half of the conduit W, partly in section; Fig. 6, a cross-section of the conduit complete; and Fig. 7, the other half of the conduit, showing the cable-sheave in position. Fig. 8 is a cross-section on line *x x* of Fig. 5, and Fig. 9 a cross-section on line *y y* of Fig. 7. Fig. 10 is an enlarged view of the upper part of the conduit.

Similar letters refer to similar parts throughout the several views.
The letters A A represent the extra friction-wheels, which are rough-grooved to prevent the slipping of the cable over them, and have beveled faces fitting into corresponding recesses in car-wheels A' A', as best seen in Fig. 3, secured, as ordinarily, to the axles, and running over the track. These beveled faces have grooves provided with a leather filling, *a*, to prevent the revolving of the friction-wheels when thrown into gear with the recesses of the car-wheels, forming thereby a perfect friction-clutch. The cable, in running over these friction-wheels, is directed by the two guides B B, both with spiral springs, the one on the front of the car leading the cable from the conduit over the wheels, and the other on the rear end laying the cable after it has passed the wheels. The friction-wheels are put in or out of gear by straps C C, running across them, and the latter are provided with proper hinges or joints for their being applied to the ends of the car-axle; also with two loose pins for easy removal. They are, moreover, made to press upon the cap-nuts of the friction-wheels by levers D D, which pass through suitable joints, *d d*, and are secured to the bottom of the car. These levers, together with the rods F F, that govern the brakes, work upon the two lever-wheels E E, which latter again are connected together by rod G, pivoted at one end to the lug of the rear lever-wheel, while the front one of the two lever-wheels is connected to and governed by the brake-wheel, of usual construction, placed on the car.

The conduit W, for my cable car, is placed outside of and parallel with the car-track, leaving an opening, *o*, on the side next to the track, to let the cable come up and pass over the wheels. This conduit, which may be made much narrower than is usual, by reason of not employing a grip within it, is constructed of four main pieces—its two sides H and I and top and bottom plates, N and K. The side H has three interior dovetailed catches, *h h*, to receive an equal number of cross-bars, M, while the opposite side, I, is provided with brackets *i* near the top, having pins *i'* in them to hold the top plate on and keep it from rising or moving. On the inside of the side I is cast a lug, P, forming an elongated journal for the shaft of the sheave J, over which the cable passes. K and N, the respective top and bottom plates of the conduit W, are both flanged, the former having lugs with bolts L passing through them for the sides to fit into.

The letter O indicates merely a piece of the track-rail placed on the conduit, to show how the latter comes to the former, and *o'* are lugs, two of them placed on the inside and one on the outside of each lateral plate of the conduit.

Having fully described my invention, what I desire to claim and secure by Letters Patent is—

1. In a cable railway, the grooved friction-wheels A A, adapted to engage with the car-wheels A' A', and acting as friction-clutches, all substantially as set forth.

2. The combination of friction-wheels A A with jointed straps C C, for operating said friction-wheels, all substantially as set forth.

3. The combination of friction-wheels A A with the cable and the self-adjusting cable-guides B B, as described and shown.

4. The combination of friction-wheels A A, straps C C, guides B B, levers D D, rods F F, lever-wheels E E, and connecting-rod G, as described and shown.

5. In cable railways, the conduit W, composed of upper, lower, and two side plates placed outside of and parallel with the car-track, and secured and put together as shown and described.

6. The combination, in a conduit, of side plates, H and I, provided with brackets $i$ and pins $i'$, for securing the top plate, N, in position, and the bottom plate, K, said side plates being secured by dovetailed lugs and bars, all substantially as set forth.

In testimony whereof I affix my signature in presence of two witnesses.

CHARLES MOUSLEY.

Witnesses:
WILLIAM F. LARER,
WM. L. LARER.